(12) United States Patent
Tandon et al.

(10) Patent No.: US 12,405,940 B1
(45) Date of Patent: Sep. 2, 2025

(54) FEATURE-BASED DATA ROLLBACK

(71) Applicant: Zoom Communications, Inc., San Jose, CA (US)

(72) Inventors: Saurabh Tandon, Bangalore (IN); Qing Wang, Hangzhou (CN); Jiaguo Wu, Hefei (CN); Yi Zang, Suzhou (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/484,047

(22) Filed: Oct. 10, 2023

(51) Int. Cl.
*G06F 16/23* (2019.01)

(52) U.S. Cl.
CPC ........ *G06F 16/235* (2019.01); *G06F 16/2365* (2019.01); *G06F 16/2379* (2019.01)

(58) Field of Classification Search
CPC . G06F 16/235; G06F 16/2379; G06F 16/2365
See application file for complete search history.

(56) References Cited

U.S. PATENT DOCUMENTS

| | | |
|---|---|---|
| 7,552,150 B2 | 6/2009 | Olson-Williams |
| 7,730,032 B2 | 6/2010 | Idicula et al. |
| 7,873,605 B2 | 1/2011 | Bhattacharyya et al. |
| 11,263,173 B2 | 3/2022 | Bedadala et al. |
| 2008/0249988 A1* | 10/2008 | Chaitanya ............. G06F 16/252 |
| 2011/0078657 A1* | 3/2011 | Okada ................. G06F 11/1438 717/116 |
| 2015/0186228 A1* | 7/2015 | Kumar ................ G06F 11/2028 714/4.12 |
| 2022/0382895 A1* | 12/2022 | Kramer ............... G06F 21/6218 |

FOREIGN PATENT DOCUMENTS

KR 101071484 B1 10/2011

OTHER PUBLICATIONS

MySQL, MySQL 8.0 Reference Manual, 17.1.6.4 Binary Logging Options and Variables, https://dev.mysql.com/doc/refman/8.0/en/replication-options-binary-log.html, Retrieved from Internet Oct. 10, 2023, 25 pages.
Red Gate, SQL Source Control 5, https://documentation.red-gate.com/soc5/common-tasks/undo-a-change, May 18, 2016, 4 pages.

* cited by examiner

*Primary Examiner* — Loc Tran
(74) *Attorney, Agent, or Firm* — Young Basile Hanlon & MacFarlane, P.C.

(57) ABSTRACT

Pre-update data are changed to post-update data via a set of data update commands executed to process a data modification request. A rollback context that is based on the data modification request is associated with the pre-update data and the post-update data. A rollback request associated with the rollback context is received. In response to receiving the rollback request, a data rollback script is generated. The data rollback script, when executed, changes at least some of the post-update data to corresponding pre-update data. The data rollback script is then executed.

19 Claims, 9 Drawing Sheets

FEATURE-BASED DATA ROLLBACK

FIELD

This disclosure generally relates to data rollback, and, more specifically, to feature-based data rollback.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
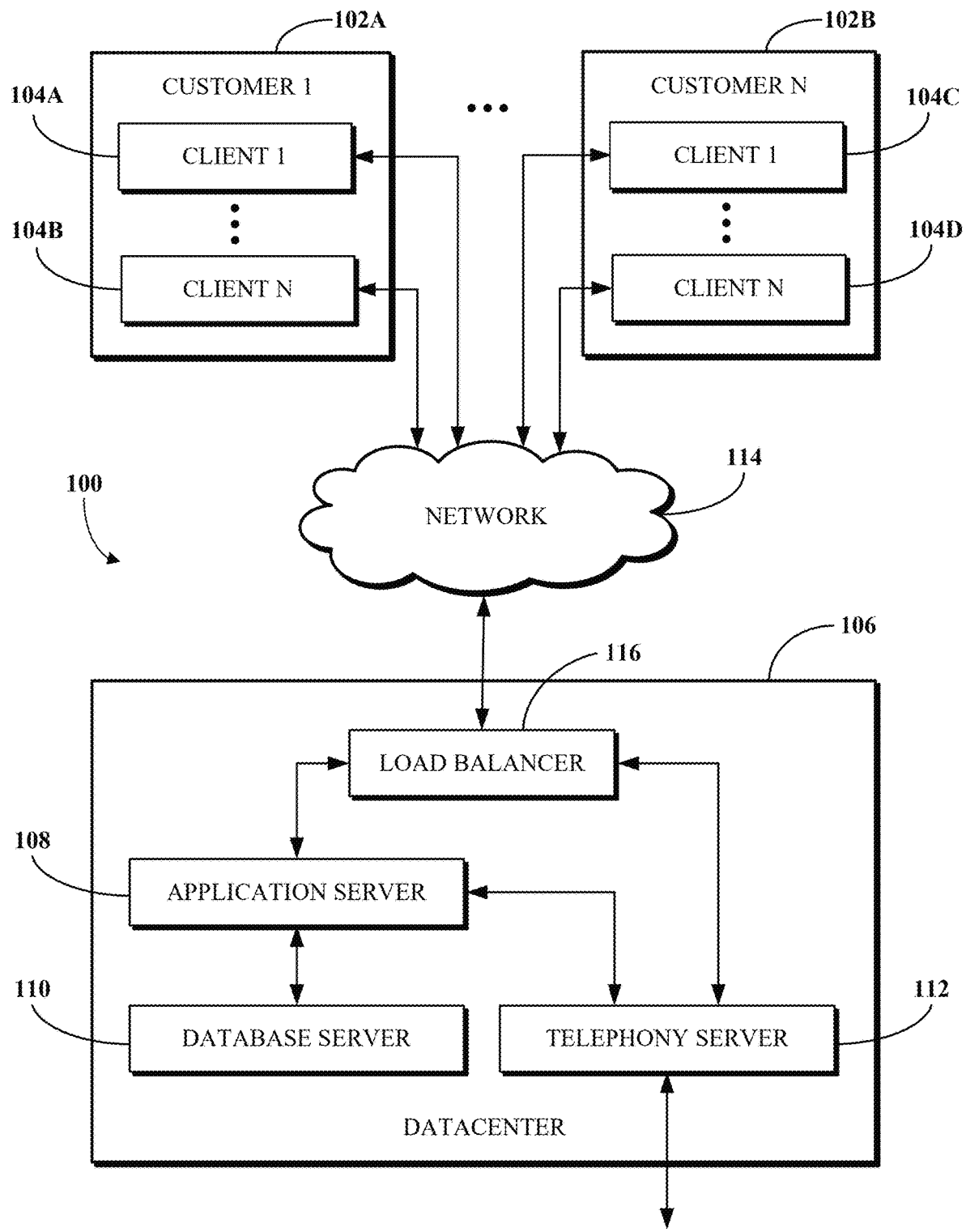
FIG. 1 is a block diagram of an example of an electronic computing and communications system.

Software platforms or applications, such as conferencing software or a UCaaS as well as practically every software, often utilize a long-term storage solution, such as a database, to store application data and system data, such as user data, meeting data or other domain-specific data, configuration settings, or other data that are to be retained even after software updates or system restarts. There is often a need to restore data in a database to a prior state, such as before an update was executed. Such restoration processes may, for example, use transaction logs. A transaction log is a sequential record of all changes made to the database, capturing every modification, addition, or deletion and, as such, can be used to facilitate recovery (e.g., restoration) operations. For example, in the event of a hardware failure or application crash, a transaction log can be used to restore the database to a most recent consistent state by replaying or rolling back uncommitted transactions.

Transaction logs can also be used in reversing database changes. For example, it may be necessary to reverse certain database changes (e.g., changes to data in the database) caused by application logic problems. To illustrate, consider a conference scheduling application that defaults to storing start times in the Eastern Time Zone (ET). If users in time zones other than ET select 3:00 at their local time zones as conference start times, the application logic may have mistakenly saved these times as 3:00 ET, causing confusion for attendees. In some cases, even with correct application logic that conforms to requirements, it may be desirable to undo the impact on the database of such application logic.

Consider another illustrative example where an application feature may enable users to update their respective application profiles via a user interface of a conferencing application. The profile data may be distributed (e.g., spread out) over three, five, or more database tables. As such, to reverse a profile update, the specific updated rows in each of the tables and that were updated by the profile update operation would have to identified.

However, identifying which data to reverse using transaction logs can be a difficult, if not a daunting, task. Transaction logs can be voluminous, capturing every transaction or operation. Sifting through this massive amount of data to pinpoint data specific to an application feature can be akin to finding a needle in a haystack. Moreover, the logic behind certain database transactions, especially in intricate applications, can be complex. Understanding the implications of each logged transaction and how it might contribute to a logical error or an application feature requires deep knowledge or analysis of the application's workings. Additionally, although a transaction log records individual transactions, it does not capture the broader context (referred to herein as "rollback context") surrounding those transactions, such as which specific application features or the execution of which particular application code implementing those features led to the data alterations. Without understanding the broader context, it can be hard to identify which data changes to reverse due to the lack of traceability from transaction logs to application logic resulting in or contributed to database changes.

Implementations of this disclosure address problems such as these by associating rollback contexts with a set of changes in a database. That is, a rollback context can be associated with a set of database commands that result in a set of database transactions and/or a set of data changes in the database. Feature-based data rollback can be enabled or implemented by associating rollback contexts with a set of database commands (e.g., a set of data update commands). An application (or software) feature can be thought of or defined as a unit of functionality that satisfies a requirement, represents a design decision, provides a configuration option, or the like. Feature-based data rollback offers several benefits, including eliminating the need for manual transaction tracking and brute force data restoration, and identifying and rolling back all logically related data changes therewith leaving the data in the database in a semantically consistent state.

In some implementations, pre-update data are changed to post-update data via a set of data update commands executed to process a data modification request. A rollback context that is based on the set of data update commands is associated with the pre-update data and the post-update data. A rollback request associated with the rollback context is received. In response to the rollback request, a data rollback script is generated. The data rollback script, when executed, changes at least some of the post-update data to corresponding pre-update data. The data rollback script is then executed. Feature-based data rollbacks pertaining to customer data, including modifications to any aspect of user data, may be conducted upon receiving a request from the customer. In cases where a customer-initiated request for a feature-based data rollback is not present, any such rollback that affects customer data will require prior approval from the customer before implementation.

The systems and techniques of this disclosure, regardless of implementation, are transparently operated and performed within the boundaries of established data privacy protection frameworks that serve to safeguard user privacy and maintain data sovereignty. In particular, it is of serious importance that users knowingly consent to their data being used in connection with the systems and techniques of this disclosure before such use occurs. Thus, engagements with user data in accordance with the implementations hereof are contingent upon appropriate user consent first being obtained. To describe some implementations in greater detail, reference is first made to examples of hardware and software structures used to implement a system for feature-based data rollback.

FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
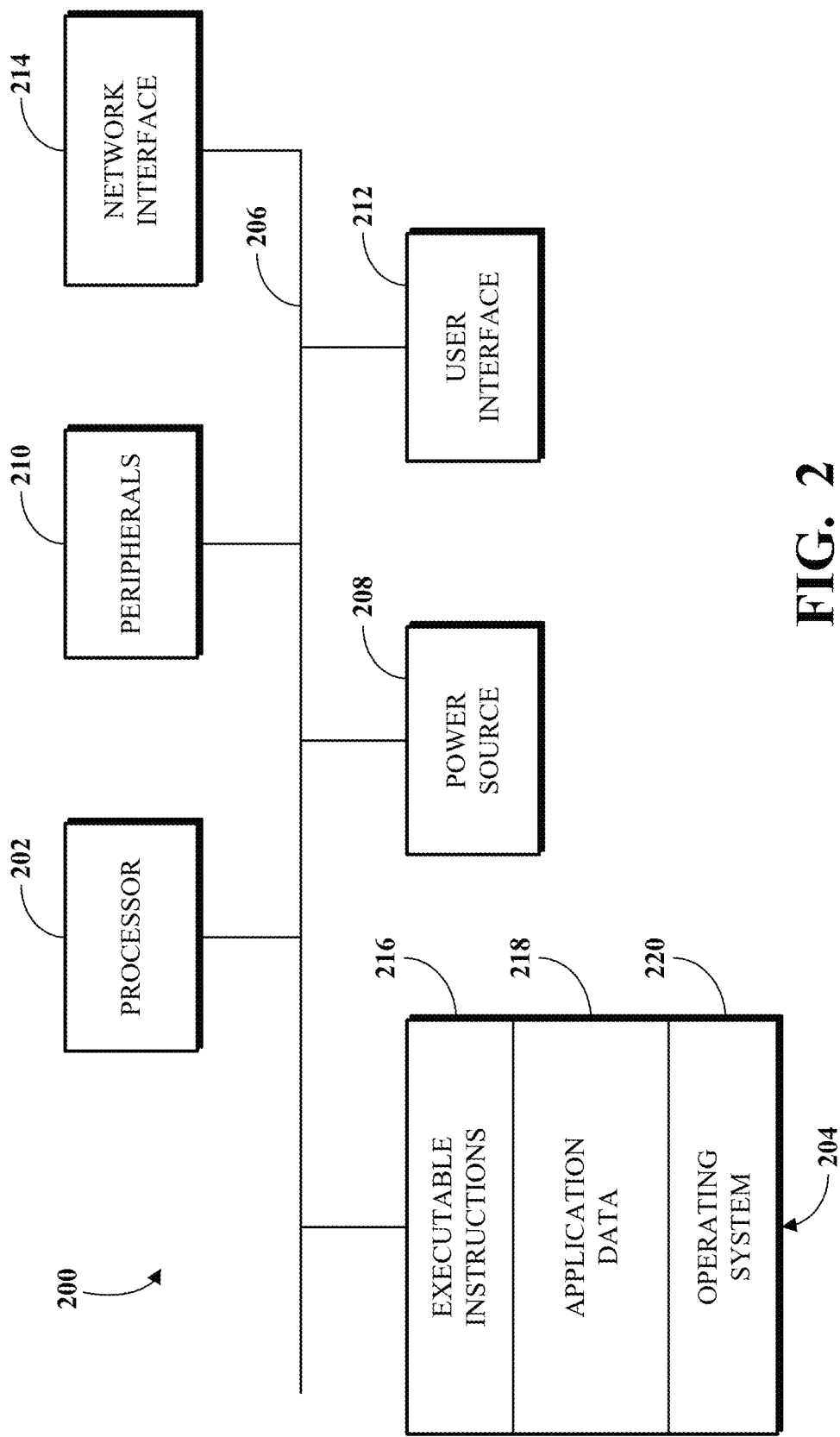
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 702.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
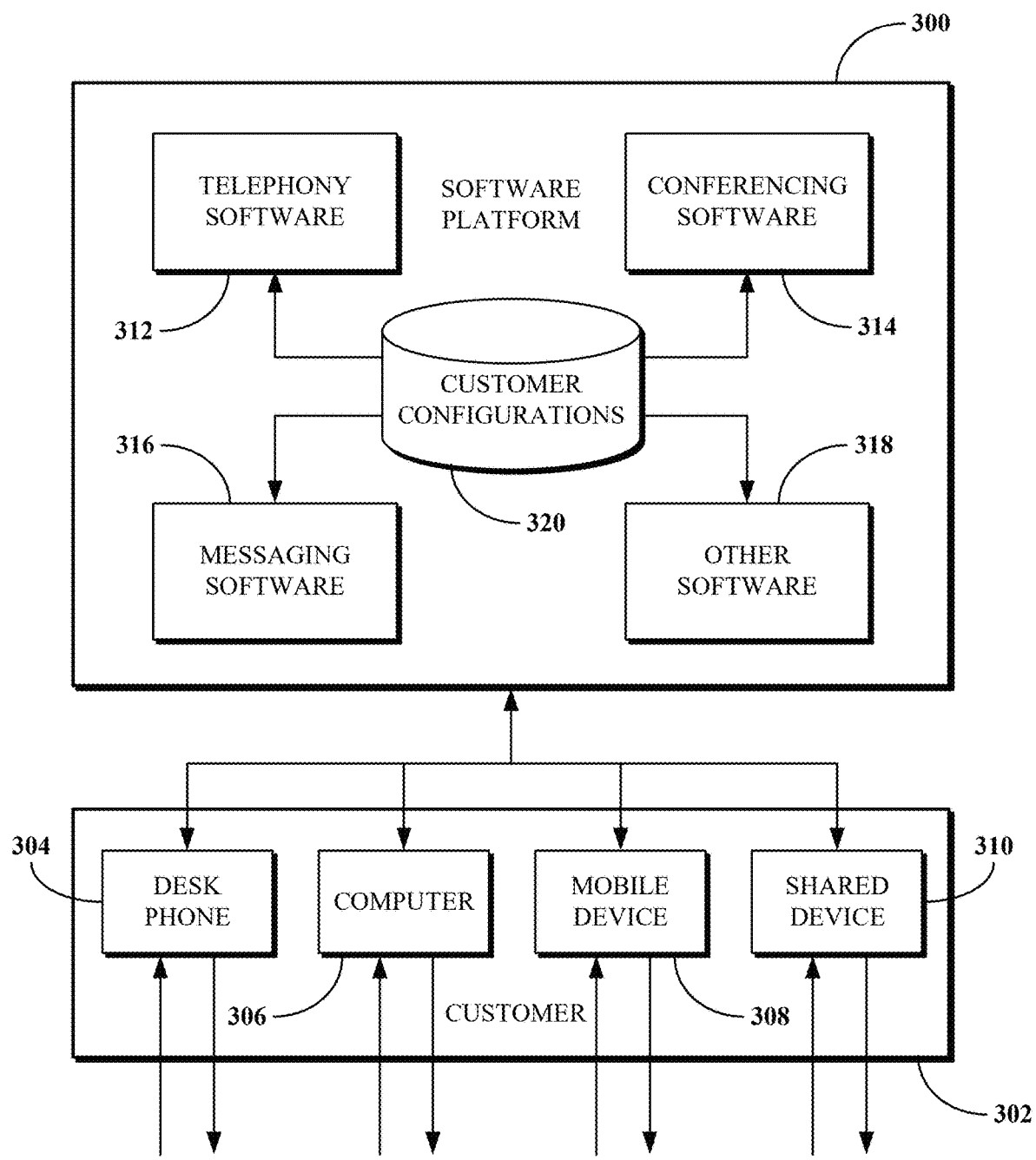
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a data restorer that implements, a least in part, feature-based data rollback.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4A:
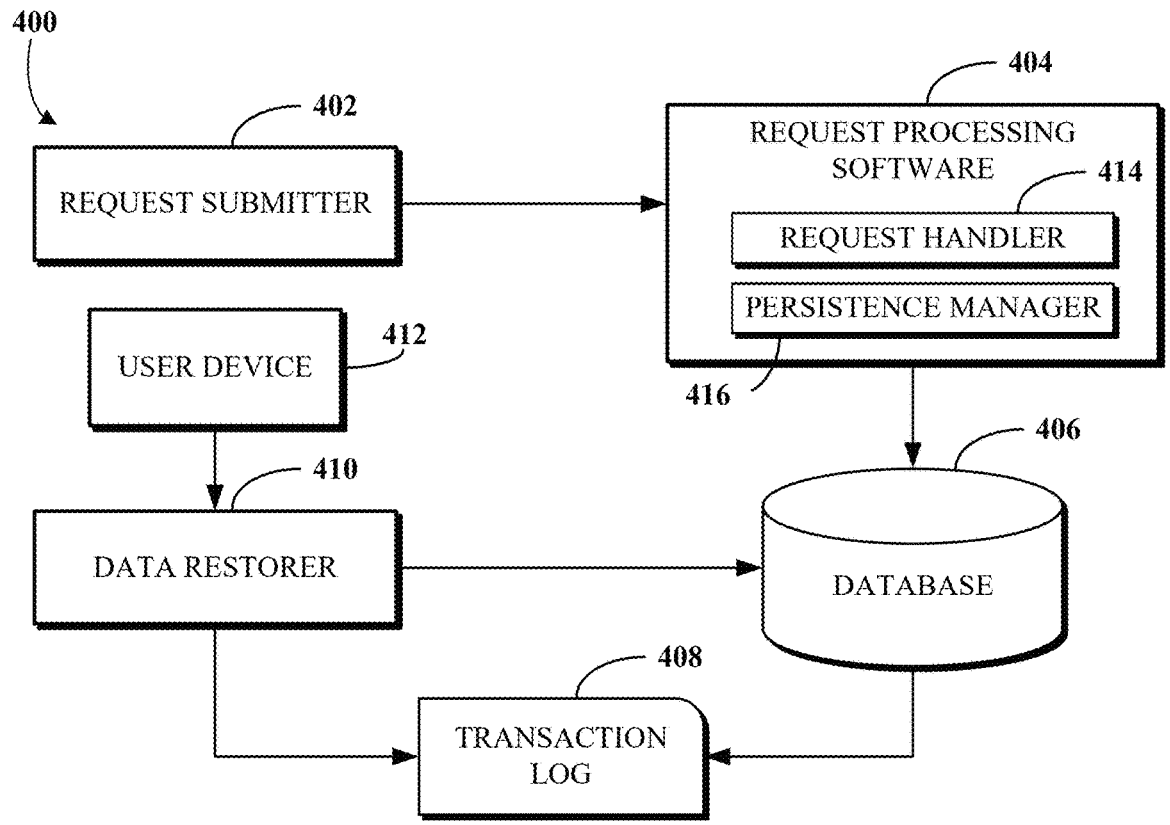
FIG. 4A is a block diagram of a system for feature-based data rollback.

FIG. 4A is a block diagram of a system 400 for feature-based data rollback. The system 400 includes a request submitter 402, a request processing software 404, a database 406, a transaction log 408, a data restorer 410, and a user device 412. More precisely, the term "database 406" refers to a comprehensive database system encompassing the management of one or more individual databases utilized by the request processing software 404 for data storage. However, for brevity and clarity the term "database 406" is used. The request processing software 404 can be one or more software of the software platform 300 or a software of the system 400 or an application therein.

As can be appreciated, the request processing software 404 may receive requests from many request submitters, such as the request submitter 402. To illustrate, via user interfaces associated with the request processing software 404, a human user may cause a request to be submitted to the request processing software 404. As another illustration, a request submitter may be an automated process or system that programmatically submits requests to the request processing software 404, such as via APIs provided by the request processing software 404. At least some requests may result in modifications to data in the database 406.

The request processing software 404 may be architected to include request handlers, such as a the request handler 414, and a persistence manager 416. However, the disclosure is not limited and other software implementations are possible. The request processing software 404 may include different handlers for different types of requests. A request handler can be an entry point into the request processing software 404 for handling the request. A request handler may be associated with a feature of the request processing software 404. As mentioned above, an application feature can be thought of or defined as a unit of functionality of the request processing software 404 that satisfies a requirement, represents a design decision, provides a configuration option, or the like. More colloquially, a feature is a specific identifiable thing that the request processing software 404 can do. To illustrate, a feature could be letting a user update their application profile, adding invitees to a conference, or drawing a box on a whiteboard.

A request handler, such as the request handler 414, sets a rollback context that can be associated with data changes in the database 406 and that due to or caused by the request. The rollback context can include any data usable by the data restorer 410 for identifying transactions or rows in the database 406 to be rolled back. In an example, the rollback context may include a tracking identifier (ID) that identifies a request handler and/or the application feature related to the request handler. The tracking ID can have the format <FEATURE>_<RANDOM NUMBER>, where <FEATURE> identifies a particular request handler or application feature and <RANDOM NUMBER> can be a random number that uniquely identifies the particular request. To illustrate, assuming the request is related to a user profile update, then the tracking identifier can be PROFILE_UPDATE_37889341. The rollback context can include other data, such a user identifier (e.g., a username) of a user associated with the request, and/or a customer (which can be as described with respect to FIG. 1). The disclosure herein is not limited to or by any particular formats for rollback contexts and other formats are possible.

The persistence manager 416 interfaces with the database 406. To simplify software development, the persistence manager 416 acts as a funnel for at least most (e.g., all) database interactions of the request processing software 404 with the database 406. The persistence manager 416 shields the other parts (e.g., code) of the request processing software 404 from intricacies of the database 406. In an example, the persistence manager 416 associates rollback contexts set by request handlers with database commands.

The transaction log 408 is associated with the database 406 and can be configured to include before-update data, after-update data, and/or the database commands that caused data changes. The transaction log 408 may be so configured via configuration of the database 406, which writes the before-update data, the after-update data, and the database commands to the transaction log 408. The database commands are received from the request processing software 404. For simplicity of explanation, database commands herein are assumed to be Structured Query Language (SQL) statements or commands. However, the disclosure is not so limited.

The data restorer 410 includes tools, such as programs, subprograms, functions, routines, subroutines, operations, executable instructions, and/or the like for, inter alia and as further described below, feature-based data rollback in the database 406.

The data restorer 410 provides user interfaces usable to obtain data changes related to rollback contexts and to generate update scripts for reversing (e.g., rolling back) the data changes. For example, via the user device 412, which can be as described with respect to the computing device 200 of FIG. 2, a user can access the data restorer 410 and use the user interfaces provided thereby, as further described with respect to FIGS. 6A-6B. An update script generated by the data restorer 410 can be executed (such as by the database 406) to reset post-update data to their pre-update states (e.g., values). The data restorer 410 can read the transaction log 408 to list rollback contexts included therein and/or identify data changes related to one or more rollback contexts.

Figure 4B:
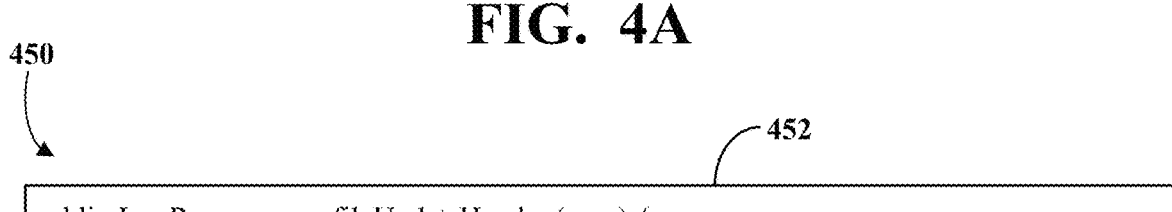
FIG. 4B is an example of generating a rollback context usable for feature-based data rollback.
Figure 4B:
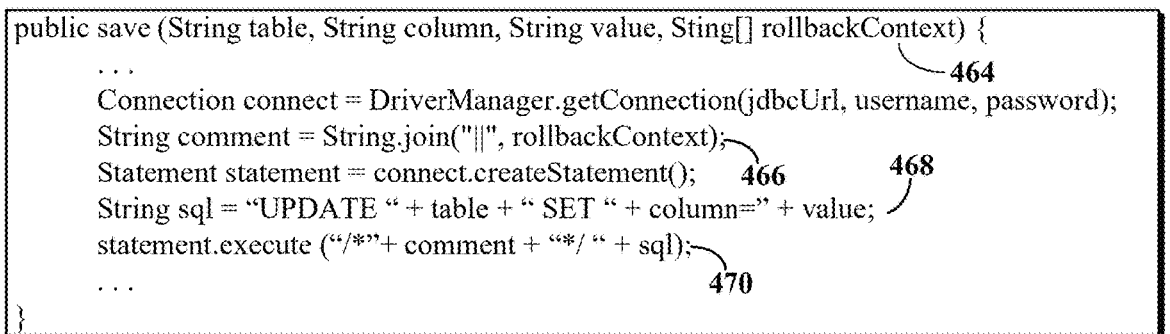

FIG. 4B is an example 450 of generating a rollback context usable for feature-based data rollback. The example 450 illustrates but one simple implementation and the disclosure herein is not so limited. As a person skilled in the art appreciates, other implementation are possible based on the teachings herein. The example 450 illustrates respective Java code snippets 452 and 454 of a request handler, which can be the request handler 414 of FIG. 4A, and a persistence manager, which can be the persistence manager 416 of FIG. 4A.

The code snippet 452 illustrates that the request handler profileUpdateHandler sets (e.g., initializes) a rollback context (e.g., a variable 456 named rollbackContext) to a String array that includes four Strings. The rollback context can be specific to the particular request being handled. A first string 458 (e.g., "PROFILE_UPDATE") can be a human readable value that describes the feature implemented by the request handler. A second string 460 can be set to a random number (by calling a function getRandom ( ). The random number can be or include a timestamp corresponding to a time that the function getRandom ( ) is invoked. The second string 460 is usable to distinguish amongst requests received by the request hander. A third string 462 is set to an identifier (e.g., a username) of the user initiating the request being handled by the request handler. As mentioned above, the rollback context can include more, fewer, or other data.

The code snippet 454 illustrates an example of associating the rollback context with a database command in a transaction log, such as the transaction log 408 of FIG. 4A. As further described herein, associating the rollback context with a database command can mean, can result in, or can be equivalent to associating the rollback context with pre-update data and post-update data associated with the database command. As can be appreciated, the disclosure herein is not limited by this or any other particular implementations. In an example, each function (e.g., service or method) implemented by the persistence manager can receive or can have access to the rollback context set by the request handler that caused (directly or indirectly) the function to be called.

The example 450 illustrates that a save( ) function receives a rollback context as a parameter 464. In this particular example, the String array is converted, by a line of code 466, into a single string and stored in a variable named "comment," where the values are separated by the characters "||". A line of code 468 illustrates constructing a SQL statement based on the other parameters of the save( ) function and storing the SQL statement into a variable named "sql." A line of code 470 illustrates executing the SQL statement while also incorporating a comment within the SQL query itself. The comment is included in the query using SQL comment syntax. The resulting SQL statement will have the comment surrounded by /* and */, making it a part of the text of the query.

Figure 5:
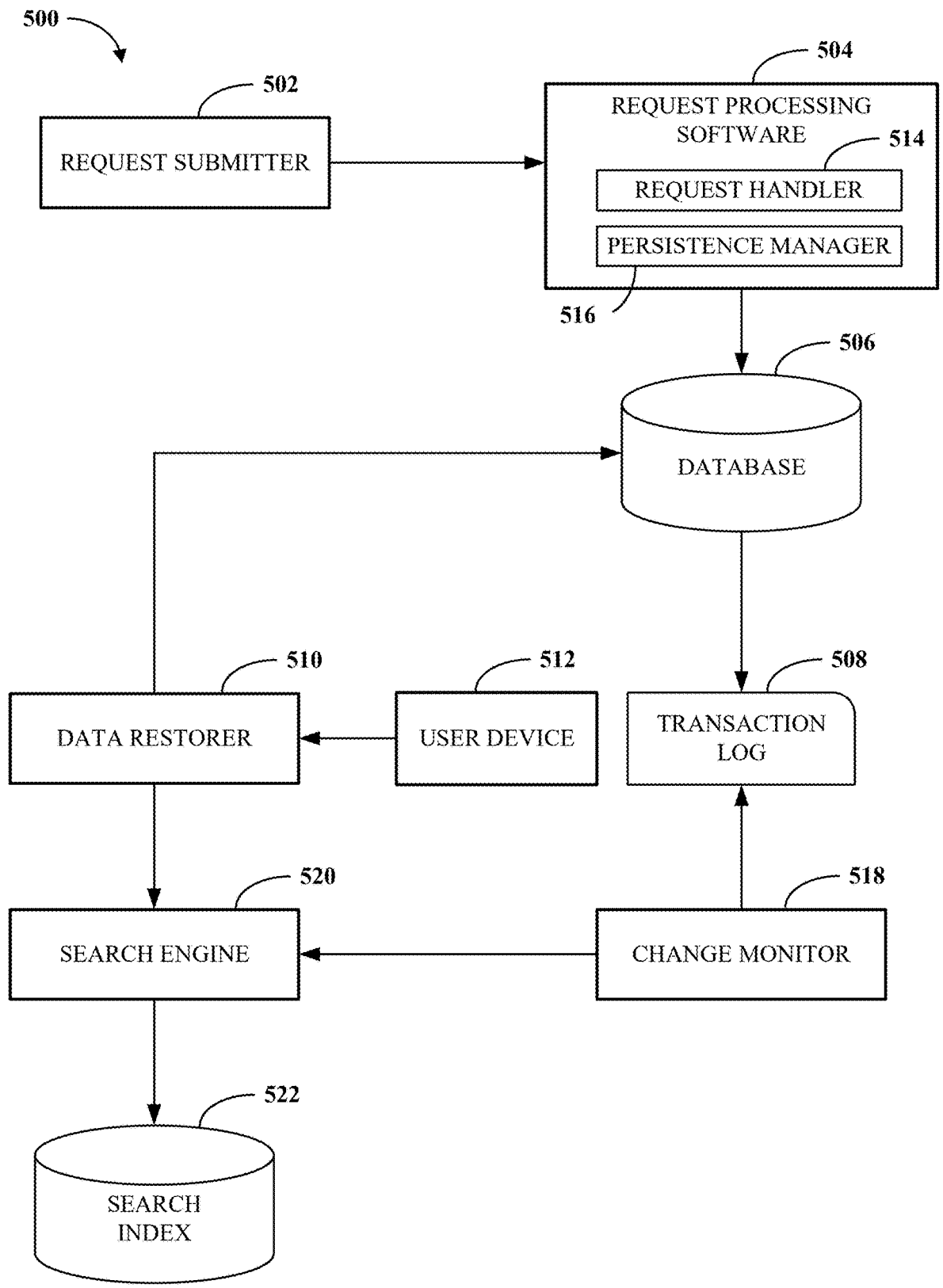
FIG. 5 is a block diagram of a system for feature-based data rollback.

FIG. 5 is a block diagram of a system 500 for feature-based data rollback. The system 500 includes a request submitter 502, which can be the request submitter 402 of FIG. 4A; a request processing software 504, which can be the request processing software 404 of FIG. 4A; a database 506, which can be the database 406 of FIG. 4A; a transaction log 508, which can be the transaction log 408 of FIG. 4A; a data restorer 510, which can be similar to the data restorer 410 of FIG. 5; and a user device 512, which can the user device 412 of FIG. 4A. As can be appreciated, a transaction log can include a significant amount of data and it can be very time consuming to find and access data therein. The request processing software 504 includes a request handler 514 and a persistence manager 516, which can be similar to request handler 414 and a persistence manager 416 of FIG. 4A, respectively.

The system 500 is distinguished from the system 400 of FIG. 4A in that the data of the transaction log 508 are indexed using a search engine 520 into a search index 522. Whereas the data restorer 410 of FIG. 4A accesses the transaction log 508 data directly from the transaction log 508 itself, the data restorer 510 accesses the indexed data of transaction log 508. The data restorer 510 accesses the indexes transaction log data via the search engine 520.

A change monitor 518, which may be included in or works in conjunction with the data restorer 510, monitors for changes to the transaction log 508. In an example, the change monitor 518 may receive notifications of changes to the transaction log 508. The change monitor 518 can obtain the changes (e.g., additions since a last received update) and forward those changes to the search engine 520 for indexing into the search index 522.

In an example, the change monitor 518 may keep track of the size (e.g., in bytes) of the transaction log 508. To read data added to the transaction log 508, the change monitor 518 periodically checks the size of the log against the previously recorded size. A detected increase in size indicates that new data have been added to the transaction log since the last check. The change monitor 518 can then initiate a process to extract and process the newly added data, which can be the data found from the previously recorded size to the end of the transaction log 508.

The search engine 520 receives transaction log entries. The transaction log entries include rollback context data, timestamps corresponding to the times that the log entries were written, pre-update data, post update data, and database commands causing the changes. The search engine 520 can be configured to index the received transaction log entries based on one or more parts of the rollback context data and the timestamps. That is, the rollback context data and timestamps can be indexed into one or more fields in the search index 522. To illustrate, the search engine 520 may be configured to index the received data based on feature descriptions (which correspond to the first string 458 of FIG. 4B). That is, the feature descriptions may be indexed into a field named "feature" of the search index 522. In another example, the combinations of feature descriptions and the random numbers may be indexed into one or two fields of the search index 522. More generally, the search engine 520 can be configured to create any fields that are deemed (e.g., usable) to facilitate the identification of data to be rolled back.

In a specific implementation, the database 506 can be a MySQL database, which is an open-source RDBMS used for storing, managing, and retrieving structured data. The MySQL database can be configured with the binary log format set to "ROW." With this configuration, every change made to a row is logged in the binary log (e.g., the transaction log 508). Instead of logging the SQL statements that modify the data, MySQL logs the actual data changes. That is, for example, when data in a row (e.g., in a column therein) in a table is updated, MySQL logs the before-update and after-update data of the row. The MySQL database can also be further configured with the property binlog_rows-_query_log_events enabled, which causes the SQL statements that cause row changes to be written to the binary log (e.g., the transaction log 508) in addition to the row changes. As such, while setting the binary log format to "ROW" logs only the row changes, enabling binlog_rows_query_log_events additionally logs the SQL statement that caused those changes, providing more context in the binary log.

The search engine 520 can be the Elasticsearch search engine, which is open-source search and analytics engine designed for efficiently storing, searching, and visualizing large volumes of unstructured and structured data. The change monitor 518 can be or can be implemented using Logstash, which is an open-source data processing pipeline tool that facilitates the collection, enrichment, transformation, and forwarding of data from various sources (e.g., the transaction log 508) to multiple destinations (e.g., the Elasticsearch engine).

In another implementation, database transaction logs may not be relied upon to implement feature-based data rollback. For example, the persistence manager may generate (i.e., may be configured or programmed to generate) rollback data that enable feature-based data rollback. For example, prior to executing a database command (e.g., an update, an insert, or a delete SQL statement) that changes data in rows in the database, the persistence manager may first read (e.g., query for) those rows as pre-update data, execute the database command, and then read those rows again to obtain post-update data.

The persistence manager can store the pre-update data and the post-update data in association with the appropriate rollback context, which can be as described above, in a searchable data store. The searchable data store can be a database that includes tables indexed based on the rollback context. In a simple implementation, the pre-update data and the post-update data can be stored in respective columns as blob data and the constituents of the rollback context can be stored in respective columns and at least some of the columns corresponding to the constituents of the rollback context can be indexed. In an example, the searchable data store can be the search index 522. As such, the rollback data generated by the persistence manager can be provided to search engine 520.

Figure 6A:
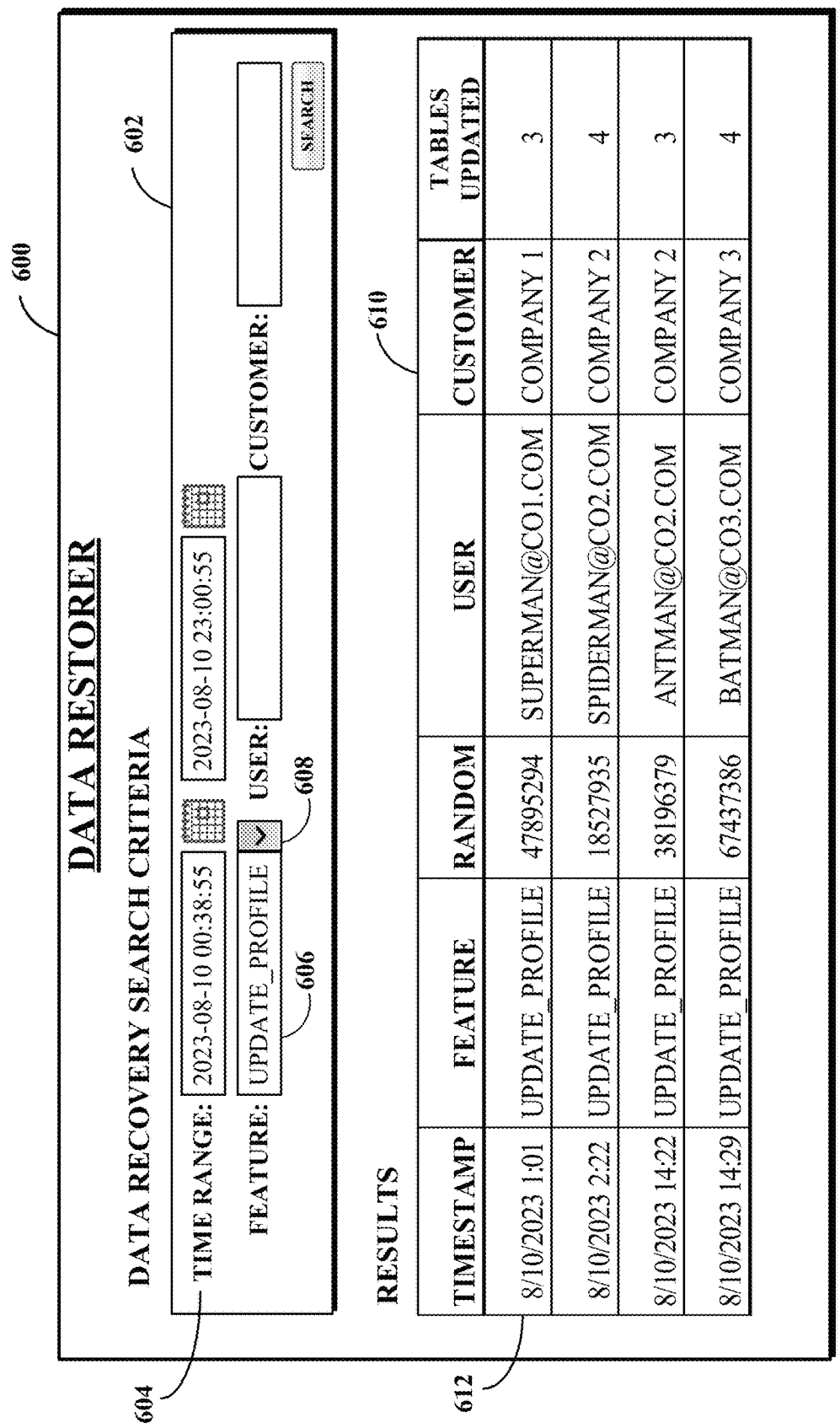
FIGS. 6A-6B illustrate user interfaces associated with a data restorer.
Figure 6B:
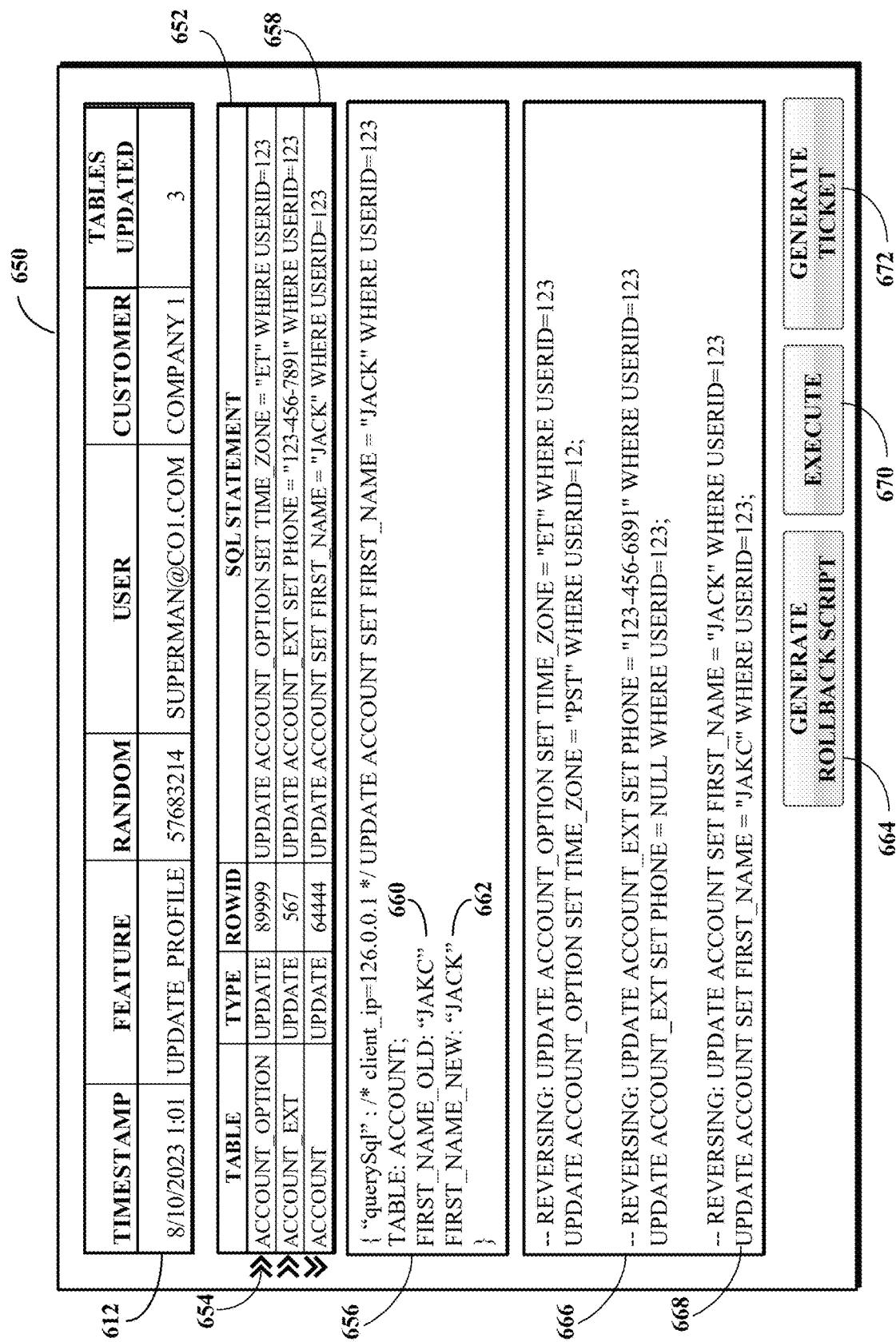

FIGS. 6A-6B illustrate user interfaces associated with a data restorer. The data restorer can be the data restorer 410 of FIG. 4A or the data restorer 510 of FIG. 5. The user interfaces can be displayed at and are operable from user devices, such as the user device 412 of FIG. 4A or the user device 512 of FIG. 5.

FIG. 6A illustrates a search user interface 600 that usable to query for and view records of data changes resulting from (e.g., associated with) requests fulfilled by an application, such as the request processing software 404 of FIG. 4A or the request processing software 504 of FIG. 5. In an area 602, the user can provide search criteria. The area 602 can include fields corresponding to at least some of the data included in rollback contexts. For example, the area 602 includes a time range input field 604 where the user can specify a time range of the data changes of interest; and in an input field 606 the user can provide the feature description of interest. The feature description can be as described with respect to the first string 458 of FIG. 4B.

As there can be many feature descriptions, the area 602 may enable the user to explore the available feature descriptions via a selector 608. For example, in response to the user invoking the selector 608, the data restorer may obtain and display to the user the available list of feature descriptions. With respect to FIG. 4A, the data explorer obtains the available list of feature descriptions from the transaction log 408 of FIG. 4A; and with respect to FIG. 5, the data explorer obtains the available list of feature descriptions from the search index 522 via the search engine 520. A table 610 shows the data changes records that match (or correspond to) the criteria provided in the area 602. The user can obtain further detail on a data changes record by, for example, selecting (e.g., clicking) that row in the table 610. For example, by clicking on a data changes record 612 (e.g., a row corresponding to a particular data changes record), the data restorer can display the user interface of FIG. 6B.

FIG. 6B illustrates a user interface 650 associated with a data changes record. As mentioned, the user interface 650 shows additional details associated with the data changes record 612 of FIG. 6A. A table 652 shows the data update commands associated with the data changes record. The data restorer obtains the data update commands from a data records repository (e.g., the transaction log 408 of FIG. 4A or, via the search engine 520, from the search index 522, as the case may be).

The table 652 illustrates that the data changes record 612 is associated with three data update commands (which are indicated in the column labeled "SQL STATEMENT" of the table 652). The table 652 also illustrates that three database tables (namely, ACCOUNT_OPTION, ACCOUNT EXT, and ACCOUNT) were impacted (e.g., modified) by the initial request. The table 652 indicates that the type of impact to each of the table is "UPDATE," as shown in a column labeled "TYPE." However, as can be appreciated, in addition to modification to columns values in rows of a database, other types of modifications include insertion of rows and deletion of rows.

Associated with each of the rows of the table 652 is a respective expander control 654. When an expander control is invoked (e.g., clicked), further details regarding that data update command are displayed in a panel 656. FIG. 6B illustrates that the expander control associated with a data command record 658 has been invoked and, as such, the panel 656 shows details therefor. In pertinent part, the panel 656 shows that prior to the execution of the data command (e.g., the SQL statement) of the data command record 658, the pre-update data (e.g., a value 660) of column FIRST_NAME, indicated by "FIRST_NAME_OLD," was "JAKC;" and that the post-update data (e.g., a value 662) of the column FIRST_NAME, indicated by "FIRST_NAME_NEW," is now "JACK."

In response to the user invoking a control 664, a rollback script (shown in script editor 666) is generated, which, if executed, would reverse (e.g., rollback) the data changes resulting from the data changes record. To illustrate, to reverse the data command (e.g., "UPDATE ACCOUNT SET FIRST_NAME="JACK" WHERE USERID=123") of the data command record 658, the data restorer includes a data command 668 in the rollback script. The data command 668 indicates that the value of the FIRST_NAME is to be updated back to its pre-update value (e.g., the value 660).

The rollback script can be generated to reverse all data commands associated with the data changes record. In an example, a user may select a subset of the rows of the table 652 (e.g., select a subset of the data update commands associated with the data changes record) and a rollback script can be generated to reverse only those selected data update commands). In an example, a rollback script may be generated for more than one data changes records. To illustrate, the search user interface 600 may include a user interface control that enables the user to cause a rollback script to be generated for data changes records selected in the table 610 of FIG. 6A. A control 670, when invoked causes the data restore to execute the rollback script. In some situations, the rollback script requires verification and approval prior to execution. As such, the user interface 650 may include a control 672, which, when invoked, kicks off a review and approval process of the rollback script.

The rollback script can reverse all changes made to a database row. That is, if N (where N≥1) column value(s) is (are) modified by a data base command, then the rollback script restores all N columns to their post-update values. However, that need not be the case, as illustrated with respect to FIG. 7.

Figure 7:
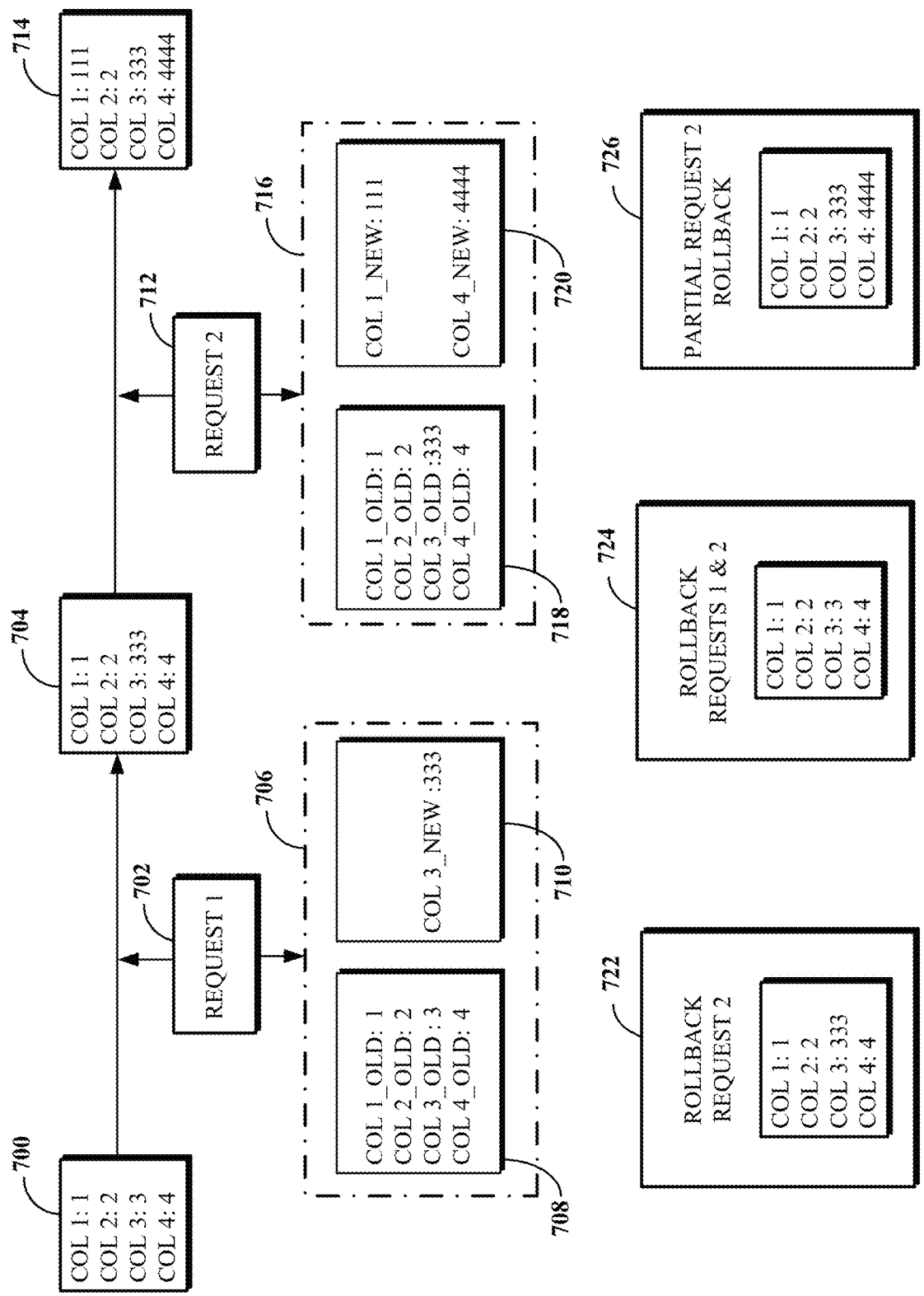
FIG. 7 illustrates examples of rollback scenarios enabled by a data restorer.

FIG. 7 illustrates examples of rollback scenarios enabled by a data restorer, which may be the data restorer 410 of FIG. 410 or the data restorer 510 of FIG. 5. FIG. 7 illustrates that a table of a database includes columns labeled "COL 1" to "COL 4." Initial values 700 of a row of the table are 1, 2, 3, and 4, for the columns COL 1, COL 2, COL 3, and COL 4, respectively.

A first request 702, which may be received from a request submitter, results in modifying the value of COL 3 to the value 333, as shown by updated values 704. As such, a data changes record 706 associated with the first request 702 includes pre-update data 708 and post-update data 710. A second request 712, which may be received from the same or another request submitter, results in modifying the value of COL 1 to the value 111 and the value of COL 4 to the value 4444, as shown by updated values 714. As such, a data changes record 716 associated with the second request 712 includes pre-update data 718 and post-update data 720. The post-update data 710 and 720 are illustrated as only showing the updated values. In another example, the post-update data 710 and 720 can include all the values of a row (or rows).

A first rollback scenario 722 illustrates that the data restorer can rollback, via a rollback script (not shown), all data changes made due to a request. As such, the first rollback scenario 722 illustrates that the values of COL 1 and COL 4 are restored back to the values shown in the updated values 704 to rollback the data changes caused by the second request 712. A second rollback scenario 724 illustrates that the data restorer can rollback, via a rollback script (not shown), all data changes made due to multiple requests. As such, the second rollback scenario 724 illustrates that the values of COL 1, COL 3, and COL 4 are restored back to the values shown in the initial values 700 to reverse the changes resulting from the second request 712 and the first request 702.

A third rollback scenario 726 illustrates that the data restorer can selectively rollback, via a rollback script (not shown), some of the data changes made due to a request. As such, the third rollback scenario 726 illustrates that only the value of COL 1 is restored back to the pre-update caused by the second request 712 but that the value of COL 4 is not restored by the pre-update value due the second request 712. The user can indicate which columns or data values are to be restored.

Figure 8:
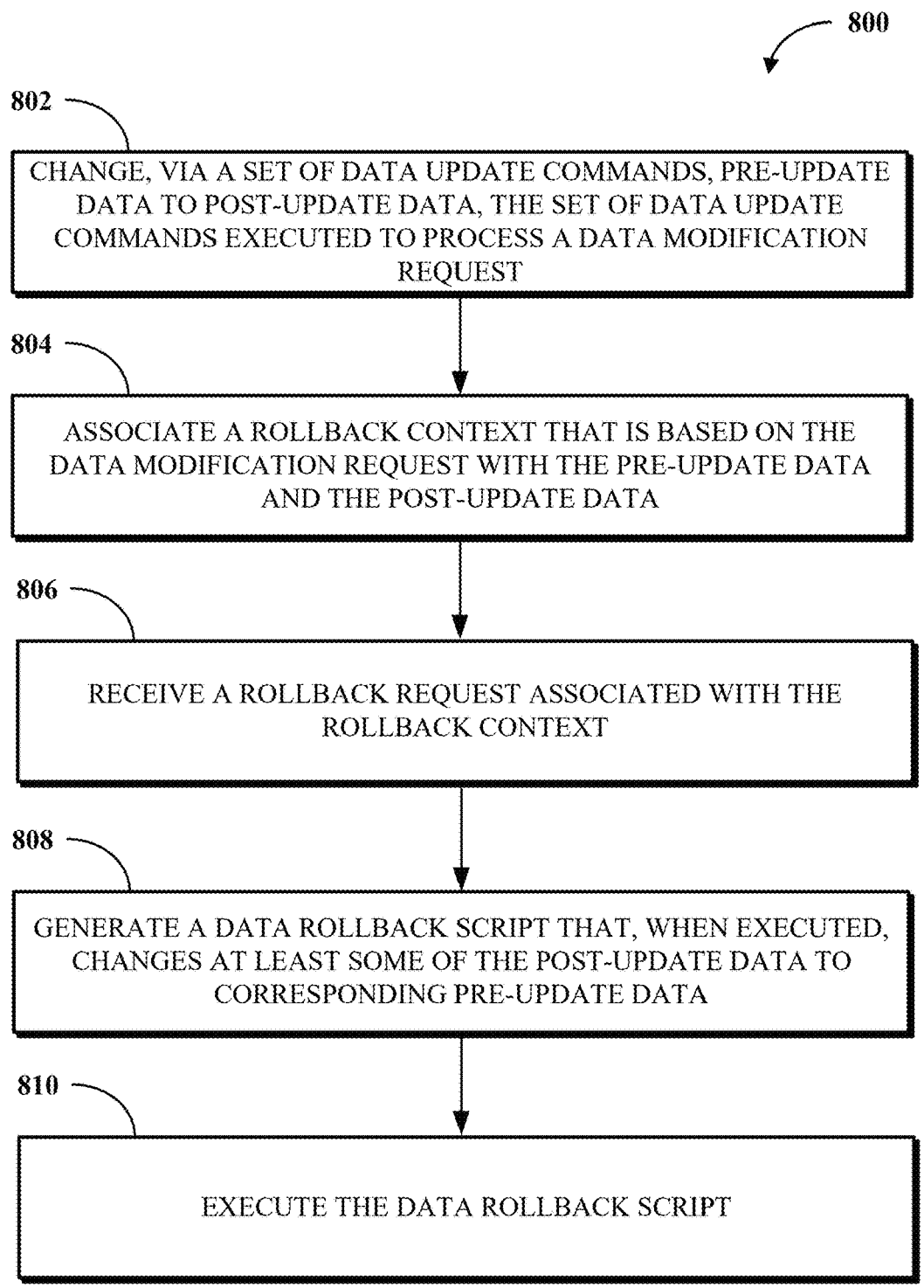
FIG. 8 is a flowchart of an example of a technique for feature-based data rollback.

To further describe some implementations in greater detail, reference is next made to examples of techniques which may be performed by or using a system for feature-based data rollback. FIG. 8 is a flowchart of an example of a technique 800 for feature-based data rollback. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations of the technique 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, pre-update data are changed to post-update data by executing a set of data update commands. The set of data update commands can be a set of SQL statements executed by software code in response to a request (e.g., a data modification request) received by the software. As described above, the set of data update commands can be executed by the software in the process of performing the request.

At 804, a rollback context that is based on the data modification request is associated with the pre-update data and the post-update data. The rollback context can be generated by a request handler that receives the data modification request. The rollback context can be or include a descriptor of the data modification request, which can be as described with respect to the first string 458 of FIG. 4B. In an example, the rollback context can be associated with the pre-update data and the post-update data in a transaction log. That is, the transaction log stores the pre-update data and the post-update data after a commit of the data modification request. For example, the rollback context can be associated, as a comment, with a SQL command that is written to the transaction log. In an example, the rollback context can be associated with the pre-update data and the post-update data in an indexing structure (e.g., the search index 522 of FIG. 5) of a search engine. As mentioned above, the rollback context can be associated with data of a row of a database and the post-update data can be at least a subset of column data of the row.

While the rollback context is described above as being set by a request handler and is associated with all data update commands flowing therefrom, that need not be the case. Software can be designed to link rollback contexts with various levels of code granularities. To illustrate, a rollback context may be set at the boundaries of one or multiple transactions. To provide a clearer example, a rollback context could be initiated at the start of a transaction (such as right before executing a createStatement( ) for a database connection). This rollback context can then be associated with a series of data update commands, spanning one or several database transactions, until a transaction concludes (such as when close( ) is invoked on a statement). As such, the set of data update commands associated with the rollback context can be encompassed within one or more database transaction boundaries. More generally, the rollback context can be associated with any set of semantically related data update commands such that, from an application perspective, it may be desirable to roll them back as a unit.

At 806, a rollback request associated with the rollback context is received. The rollback request can be received as described with respect to FIG. 6B. At 808, a data rollback script is generated in response to receiving the rollback request. The data rollback script, when executed, changes at least some of the post-update data to corresponding pre-update data. The data rollback script can include SQL update statements. The data rollback script can include a SQL delete statement that rolls back an insert data update command. The data rollback script can include a SQL insert statement that rolls back an insert data update command. At 810, the data rollback script is executed. Executing the rollback script includes transmitting the data rollback script to a database for execution.

The set of data update commands may change a first subset of columns in one or more rows of a table of a database. In an example, generating the data rollback script can include generating the data rollback script to change post-update data of a second subset of the columns to corresponding pre-update data of the second subset of the columns, where the second subset includes fewer columns than the first subset.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes changing, via a set of data update commands, pre-update data to post-update data, the set of data update commands executed to process a data modification request; associating a rollback context that is based on the data modification request with the pre-update data and the post-update data; receiving a rollback request associated with the rollback context; and in response to receiving the rollback request, generating a data rollback script that, when executed, changes at least some of the post-update data to corresponding pre-update data. The method also includes executing the data rollback script. Other embodiments of this aspect include corresponding computer systems, apparatus, and computer programs recorded on one or more computer storage devices, each configured to perform the actions of the methods.

Implementations may include one or more of the following features. The method where the set of data update commands can correspond to respective database structured query language (SQL) commands. The rollback context can be associated with the pre-update data and the post-update data in an indexing structure of a search engine. The set of data update commands can be within one or more database transaction boundaries. Associating the rollback context that is based on the data modification request with the pre-update data and the post-update data may include associating the rollback context with data of a row of a database, where the post-update data may include at least a subset of column data of the row. The data rollback script may include a structured query language (SQL) update statement. The data rollback script may include a structured query language (SQL) delete statement that rolls back an insert data update command. The data rollback script may include a structured query language (SQL) insert statement that rolls back an insert data update command. The set of data update commands can change a first subset of columns in one or more rows of a table of a database. Generating the data rollback script may include generating the data rollback script to change post-update data of a second subset of the columns to corresponding pre-update data of the second subset of the columns, where the second subset of the columns includes fewer columns than the first subset of the columns.

One general aspect includes a system. The system includes one or more processor; and one or more memories. The one or more processors can be configured to execute instructions stored in the one or more memories to change, via a set of data update commands, pre-update data to post-update data, the set of data update commands executed to process a data modification request; associate a rollback context that is based on the data modification request with the pre-update data and the post-update data; receive a rollback request associated with the rollback context; in response to receiving the rollback request, generate a data rollback script that, when executed, changes at least some of the post-update data to corresponding pre-update data; and execute the data rollback script. Other embodiments of this aspect include corresponding computer systems, apparatus, and computer programs recorded on one or more computer storage devices, each configured to perform the actions of the methods.

Implementations may include one or more of the following features. The system where the rollback context can be associated with at least some data of a row of a database. The rollback context can be generated by a request handler that receives the data modification request. The rollback context may include a descriptor of the data modification request. The rollback context can be associated with the pre-update data and the post-update data in a transaction log. The data update commands can be semantically related. Implementations of the described techniques may include hardware, a method or process, or computer software on a computer-accessible medium.

One general aspect includes one or more non-transitory computer readable media storing instructions operable to cause one or more processors to perform operations. The operations may include changing, via a set of data update commands, pre-update data to post-update data, the set of data update commands executed to process a data modification request; associating a rollback context that is based on the data modification request with the pre-update data and the post-update data; receiving a rollback request associated with the rollback context; in response to receiving the rollback request, generating a data rollback script that, when executed, changes at least some of the post-update data to corresponding pre-update data; and executing the data rollback script. Other embodiments of this aspect include corresponding computer systems, apparatus, and computer programs recorded on one or more computer storage devices, each configured to perform the actions of the methods.

Implementations may include one or more of the following features. The one or more non-transitory computer readable media where the rollback context can be associated with the data update commands as a comment. The operations may include constructing the rollback context to include a descriptor of the data modification request. Receiving the rollback request associated with the rollback context may include receiving a request to identify the data update commands based on the rollback context. The operations may include transmitting the data update script for approval prior to executing the data update script. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
changing, via a set of data update commands, pre-update data to post-update data, the set of data update commands executed to process a data modification request;
associating a rollback context that is based on the data modification request with the pre-update data and the post-update data in a transaction log that stores the pre-update data and the post-update data after a commit of the data modification request, wherein the rollback context comprises a tracking identifier having a format <FEATURE><RANDOM NUMBER>, where <FEATURE> identifies a particular request handler or application feature and <RANDOM NUMBER> is a random number that uniquely identifies the data modification request;
receiving a rollback request associated with the rollback context after the commit of the data modification request;
generating, based on the rollback request, a data rollback script that, when executed, changes at least some of the post-update data to corresponding pre-update data; and
executing the data rollback script.

2. The method of claim 1, wherein the set of data update commands correspond to respective database Structured Query Language (SQL) commands.

3. The method of claim 1, wherein the rollback context is associated with the pre-update data and the post-update data in an indexing structure of a search engine.

4. The method of claim 1, wherein the set of data update commands is within one or more database transaction boundaries.

5. The method of claim 1, wherein associating the rollback context that is based on the data modification request with the pre-update data and the post-update data comprises:
associating the rollback context with data of a row of a database, wherein the post-update data comprises at least a subset of column data of the row.

6. The method of claim 1, wherein the data rollback script comprises a Structured Query Language (SQL) update statement.

7. The method of claim 1, wherein the data rollback script comprises a Structured Query Language (SQL) delete statement that rolls back an insert data update command.

8. The method of claim 1, wherein the data rollback script comprises a Structured Query Language (SQL) insert statement that rolls back an insert data update command.

9. The method of claim 1, wherein the set of data update commands changes a first subset of columns in one or more rows of a table of a database, and wherein generating the data rollback script comprises:
generating the data rollback script to change post-update data of a second subset of the columns to corresponding pre-update data of the second subset of the columns, wherein the second subset of the columns includes fewer columns than the first subset of the columns.

10. A system, comprising:
one or more processor; and
one or more memories, the one or more processors configured to execute instructions stored in the one or more memories to:
change, via a set of data update commands, pre-update data to post-update data, the set of data update commands executed to process a data modification request;
associate a rollback context that is based on the data modification request with the pre-update data and the post-update data in a transaction log that stores the pre-update data and the post-update data after a commit of the data modification request, wherein the rollback context comprises a tracking identifier having a format <FEATURE><RANDOM NUMBER>, where <FEATURE> identifies a particular request handler or application feature and <RANDOM NUMBER> is a random number that uniquely identifies the data modification request;
receive a rollback request associated with the rollback context after the commit of the data modification request;
generate, based on the rollback request, a data rollback script that, when executed, changes at least some of the post-update data to corresponding pre-update data; and
execute the data rollback script.

11. The system of claim 10, wherein the rollback context is associated with at least some data of a row of a database.

12. The system of claim 10, wherein the rollback context is generated by a request handler that receives the data modification request.

13. The system of claim 10, wherein the rollback context comprises a descriptor of the data modification request.

14. The system of claim 10, wherein the data update commands are semantically related.

15. One or more non-transitory computer readable media storing instructions operable to cause one or more processors to perform operations comprising:
changing, via a set of data update commands, pre-update data to post-update data, the set of data update commands executed to process a data modification request;
associating a rollback context that is based on the data modification request with the pre-update data and the post-update data in a transaction log that stores the pre-update data and the post-update data after a commit of the data modification request, wherein the rollback context comprises a tracking identifier having a format <FEATURE><RANDOM NUMBER>, where <FEATURE> identifies a particular request handler or application feature and <RANDOM NUMBER> is a random number that uniquely identifies the data modification request;
receiving a rollback request associated with the rollback context after the commit of the data modification request;
generating, based on the rollback request, a data rollback script that, when executed, changes at least some of the post-update data to corresponding pre-update data; and
executing the data rollback script.

16. The one or more non-transitory computer readable media of claim 15, wherein the rollback context is associated with the data update commands as a comment.

17. The one or more non-transitory computer readable media of claim 15, wherein the operations further comprise:
constructing the rollback context to include a descriptor of the data modification request.

18. The one or more non-transitory computer readable media of claim 15, wherein receiving the rollback request associated with the rollback context comprises:

receiving a request to identify the data update commands based on the rollback context.

19. The one or more non-transitory computer readable media of claim 15, wherein the operations further comprise:
transmitting the data rollback script for approval prior to executing the data rollback script.

\* \* \* \* \*